(12) United States Patent
Felt et al.

(10) Patent No.: US 8,976,244 B2
(45) Date of Patent: Mar. 10, 2015

(54) PERSONAL MOBILE SURVEILLANCE SYSTEMS AND METHODS

(75) Inventors: Michelle Felt, Randolph, NJ (US);
Brian F. Roberts, Dallas, TX (US);
Donald H. Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 596 days.

(21) Appl. No.: 13/225,178

(22) Filed: Sep. 2, 2011

(65) Prior Publication Data
US 2013/0057696 A1 Mar. 7, 2013

(51) Int. Cl.
| H04N 9/47 | (2006.01) |
| H04N 7/18 | (2006.01) |
| H04W 4/22 | (2009.01) |
| G08B 21/02 | (2006.01) |
| G08B 25/01 | (2006.01) |

(52) U.S. Cl.
CPC ............ H04W 4/22 (2013.01); H04N 7/186 (2013.01); G08B 21/0283 (2013.01); G08B 25/016 (2013.01)
USPC .......................................... 348/143; 348/151

(58) Field of Classification Search
None
See application file for complete search history.

(56) References Cited

U.S. PATENT DOCUMENTS

| 6,314,308 B1 * | 11/2001 | Sheynblat et al. ............. 455/574 |
| 2002/0003470 A1 * | 1/2002 | Auerbach .................. 340/425.5 |
| 2009/0181640 A1 * | 7/2009 | Jones ......................... 455/404.2 |

OTHER PUBLICATIONS

Wikipedia, Microsoft SenseCam, 3 pages, http://en.wikipedia.org/wiki/Microsoft_SenseCam, as accessed on Aug. 19, 2011.
Bonsor, HowStuffWorks, "How Black Boxes Work," 2 pages, http://science.howstuffworks.com/transport/flight/modern/black-box10.htm, as accessed on Aug. 19, 2011.

* cited by examiner

*Primary Examiner* — Joseph Ustaris
*Assistant Examiner* — Kevin McInnish

(57) ABSTRACT

An exemplary method includes a mobile user device subsystem 1) acquiring, during operation in a normal surveillance mode, a first set of surveillance data, 2) transmitting, during operation in the normal surveillance mode, the first set of surveillance data to a server subsystem, 3) detecting, during operation in the normal surveillance mode, a trigger event, 4) transitioning, in response to the detecting of the trigger event, from operation in the normal surveillance mode to operation in an enhanced surveillance mode, 5) acquiring, during operation in the enhanced surveillance mode, a second set of surveillance data; and 6) transmitting, during operation in the enhanced surveillance mode, the second set of surveillance data to the server subsystem, wherein the second set of surveillance data comprises an enhanced set of data compared to the first set of surveillance data. Corresponding systems and methods are also disclosed.

23 Claims, 14 Drawing Sheets

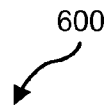

| | First set of surveillance data | Second set of surveillance data |
|---|---|---|
| Row 602-1 | Periodic GPS parameters 604-1 | Continuous GPS parameters 606-1 |
| Row 602-2 | Periodic still-shot camera images 604-2 | Continuous video images 606-2 |
| Row 602-3 | User device status data 604-3 | User device status data, User environment data 606-3 |
| Row 602-4 | User device status data, User condition data 604-4 | User device status data, User condition data, User environment data 606-4 |

Fig. 6

|  | First set of surveillance data | Second set of surveillance data |
|---|---|---|
| Row 802-1 | Continuous GPS parameters 804-1 | Periodic GPS parameters 806-1 |
| Row 802-2 | Continuous video images 804-2 | Periodic still-shot camera images 806-2 |
| Row 802-3 | User device status data 804-3 | GPS parameters 806-3 |

Fig. 8

PERSONAL MOBILE SURVEILLANCE SYSTEMS AND METHODS

BACKGROUND INFORMATION

Electronic technologies are increasingly being used for safety purposes. For example, electronic technologies are used to collect and store data that can then be used to promote safety. The collected data may be used by investigators to determine the cause of an unsafe event (e.g., an accident), by law enforcement personnel to investigate possible crimes, and/or by organizations to improve the safety of products, services, and/or events.

As an example, devices known as "black boxes" are typically installed onboard aircraft. A black box device includes a data storage medium onto which data descriptive of the operation of the aircraft (e.g., flight parameters and audio in the aircraft cockpit) is recorded. The black box device continuously records such data onto the data storage medium during operation of the aircraft. When the data storage medium is full, new data is recorded over the oldest data on the data storage medium such that the data storage medium contains the most recent data descriptive of the operation of the aircraft.

The data storage medium is typically housed in an assembly that is designed to protect the data storage medium and the data stored thereon from being damaged during an aircraft crash. Accordingly, after an aircraft crashes, personnel who investigate the crash search for the black box that was onboard the aircraft. If the black box is found, the investigating personnel may extract data descriptive of the operation of the aircraft from the data storage medium for use in determining the cause of the crash. The results of such investigations may then be used by aircraft manufacturers, flight regulators, and/or other entities to improve the safety of aircraft and/or flight regulations.

More recently, black box technologies like those implemented in aircraft have been implemented in automobiles. Accordingly, a black box device onboard an automobile may be retrieved after an automobile crash and used to extract recorded data descriptive of the operation of the automobile immediately before the crash occurred. Personnel investigating the crash, such as law enforcement personnel, automobile manufacturers, and/or automobile insurers may use the extracted data in determining the cause of the automobile crash. The data may also be used by automobile manufacturers, regulators, and/or other entities to improve the safety of automobiles and/or transportation regulations.

However, there remains room for improved electronic data collection technologies and uses of electronic data collection technologies for safety purposes.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 6 illustrates a table listing exemplary sets of surveillance data according to principles described herein.

FIG. 8 illustrates another table listing exemplary sets of surveillance data according to principles described herein.

DETAILED DESCRIPTION OF PREFERRED EMBODIMENTS

Figure 1:
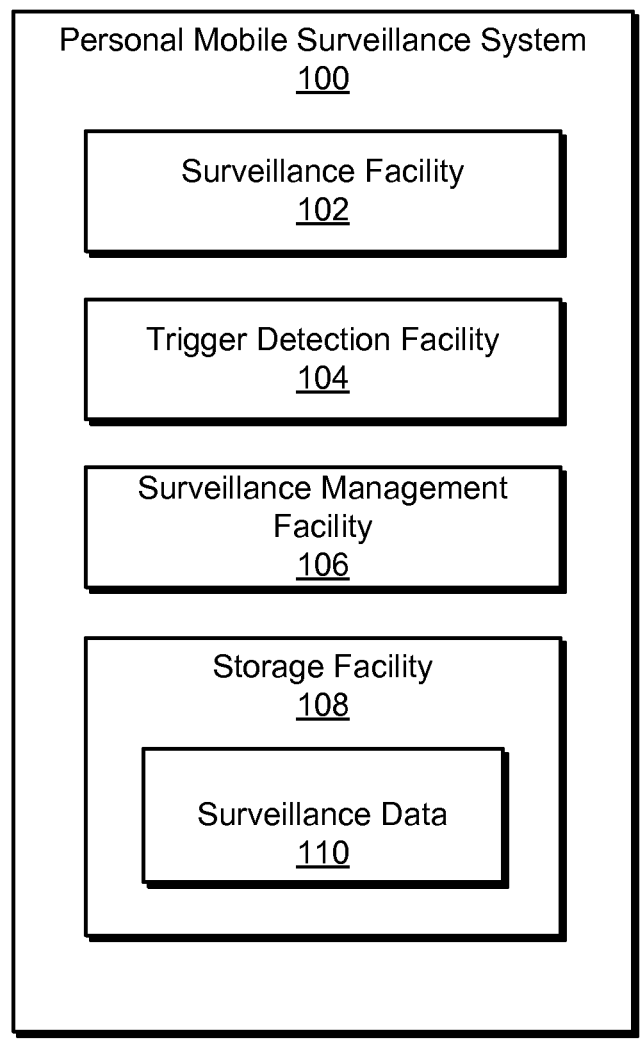
FIG. 1 illustrates an exemplary personal mobile surveillance system according to principles described herein.

Exemplary personal mobile surveillance systems and methods are described herein. In certain examples, the personal mobile surveillance systems and methods may acquire surveillance data associated with a user of one or more personal mobile user devices that may be conveniently, discretely, regularly, and/or non-intrusively carried with and/or by the user (e.g., held and/or worn by the user). Accordingly, surveillance data associated with the user may be acquired wherever the user is located (e.g., at home, at school, at work, traveling, commuting, walking, outdoors, etc.).

In certain examples, the personal mobile surveillance systems and methods may acquire surveillance data in a manner that intelligently utilizes and conserves system resources, such as resources of the one or more mobile user devices (e.g., memory, processing, and/or power resources) and/or network resources (e.g., network bandwidth). For example, the personal mobile surveillance systems and methods may intelligently and dynamically select and operate in accordance with a particular surveillance mode that governs the surveillance data that is acquired during operation in accordance with that mode. A surveillance mode may be selected and corresponding surveillance data acquired as appropriate for a particular situation of a user, which may be determined based on the monitored status of the user, one or more mobile user devices associated with the user, and/or the physical environment of the user.

To illustrate, in certain embodiments, a personal mobile surveillance system may 1) acquire a first set of surveillance data during operation in accordance with a normal surveillance mode, 2) detect, during operation in accordance with the normal surveillance mode, a predefined trigger event (e.g., an event indicative of a potentially dangerous situation proximate a user), 3) transition from operation in accordance with the normal surveillance mode to operation in accordance with an enhanced surveillance mode in response to the trigger event, and 4) acquire, during operation in accordance with the enhanced surveillance mode, a second set of surveillance data, wherein the second set of surveillance data comprises an enhanced set of data compared to the first set of surveillance data.

In this or a similar manner, when there is no detected potential for danger proximate a user, a first set of surveillance data may be acquired. When a potential for danger proximate the user is detected, a second, enhanced set of surveillance data may be acquired. The enhanced set of surveillance data may be more robust than the first set of surveillance data in order to provide more information when there is a detected potential for danger proximate the user. Accordingly, the acquisition of the enhanced set of surveillance data may consume more system resources than are consumed by the acquisition of the first set of surveillance data. Hence, system resources may be conserved by acquiring a select set of surveillance data when no potential for danger is detected, and more system resources may be used to acquire an enhanced set of surveillance data when a potential for danger is detected.

These and/or other benefits provided by the disclosed exemplary systems and methods will be made apparent herein. Examples of personal mobile surveillance systems and methods will now be described in reference to the accompanying drawings.

FIG. 1 illustrates an exemplary personal mobile surveillance system 100 (or simply "system 100"). As shown, system 100 may include, without limitation, a surveillance facility 102, a trigger detection facility 104 (or simply "detection facility 104"), a surveillance management facility 106 (or simply "management facility 106"), and a storage facility 108, which may be in communication with one another using any suitable communication technologies. It will be recognized that although facilities 102-108 are shown to be separate facilities in FIG. 1, any of facilities 102-108 may be combined into fewer facilities, such as into a single facility, or divided into more facilities as may serve a particular implementation.

Surveillance facility 102 may be configured to acquire surveillance data, which, as used herein, refers to data representative of the status (e.g., one or more conditions) of a user device, a user, and/or a physical environment of the user device and/or user. For example, surveillance data may include user device status data representative of the status of operation of a user device, resources of a user device that are being used and/or that are available (e.g., device power, memory, processing resources used and/or available), and/or one or more physical properties of a user device. Examples of physical properties of a user device include, without limitation, acceleration, speed, direction (e.g., directional heading), velocity, altitude/elevation, orientation (e.g., right-side up, up-side down, upright, sideways, etc.), temperature, and/or geographic location (e.g., GPS coordinates) of the device. Additionally or alternatively to user device status data, surveillance data may include biometric data representative of one or more physical conditions (e.g., heart rate, body temperature, etc.) of a user of a user device. Additionally or alternatively, surveillance data may include environmental data representative of conditions and/or properties of a physical environment of a user device. Examples of environmental data include, without limitation, audio data representative of audio within a physical environment, still-image data (photos) representative of images of a physical environment, video data representative of video images of a physical environment, and temperature data representative of ambient temperature of a physical environment.

The environment may include any physical space within which a user device is located. For example, the environment may include a room within a home, building, or other structure, an outdoor area (e.g., a street, a walkway, etc.), an interior of a vehicle (e.g., a bus, train, etc.), and any other physical space within which a user device is located.

Surveillance facility 102 may acquire surveillance data in any suitable way. For example, surveillance facility 102 may include or be implemented by one or more mobile user devices associated with a user and that include one or more sensors (e.g., camera sensors, microphones, thermometers, heart rate monitors, accelerometers, gyroscopes, etc.) configured to capture surveillance data. Additionally or alternatively, surveillance facility 102 may acquire surveillance data by communicating with one or more systems of a user device (e.g., an operating system, a resource monitoring system, a location tracking system such as a GPS system, etc. of a user device) to request and receive user device status data. Exemplary user devices and configurations of user devices are described herein.

Detection facility 104 may be configured to detect a predefined trigger event. As used herein, a predefined trigger event may include any event or set of events predefined to function as a trigger for one or more operations of surveillance facility 102 and/or management facility 106. Examples of trigger events include, without limitation, predefined changes to the status of operation of a user device, resources of a user device that are being used and/or that are available, physical properties of a user device, physical conditions of a user, and/or environmental conditions capable of being monitored by surveillance facility 102. Additional or alternative examples of trigger events include, without limitation, an execution of a predefined operation by a user device, receipt of a predefined user input by a user device, anomalistic usage of a user device compared to historical usage patterns (e.g., an anomaly to a text messaging or calling pattern), and detection of a predefined condition of a user device, user, environment, or network (e.g., low availability of system resources).

In certain examples, a predefined trigger event may be indicative of potential danger proximate a user. To illustrate, a predefined trigger event may include initiation of a communication to an emergency response organization or an emergency contact person (e.g., an initiation of an emergency phone call such as a "911" phone call, a transmission of a text message or an email message to an emergency response organization, etc.) by a user device, detection of a user selection of a predetermined button such as an "emergency," "panic," or "caution" button in a graphical user interface (e.g., a user selects a button when the user feels unsafe such as when entering a potentially dangerous environment), a predefined change in a physical property of a user device (e.g., a change in acceleration, speed, geographic location, and/or other physical property of a user device that satisfies a predetermined threshold or criterion), a powering down of a user device, a physical fall of or impact to a user device, inactivity of a user device (e.g., prolonged inactivity of a user device, a sudden transition from activity to inactivity of a user device such as a sudden stop in keyboard usage, etc.), a user device becoming stationary after moving or moving after being stationary, a detection of environmental audio that matches predefined criteria (e.g., a person's yell for "help," a human voice that is above a predetermined decibel level, a siren of an emergency response vehicle, a sounding of an alarm such as a smoke detector or fire alarm), an anomaly to normal historical operation and/or activity of a user device and/or user (e.g., a diversion from a regular travel route, inactivity of a user device at a time of day that the inactivity is out of the ordinary, an abnormal failure to respond to incoming messages, etc.), a detection of a person designated as being potentially dangerous to the user (e.g., an estranged spouse or a person that is the subject of a restraining order) entering a proximity of the user, any other event or combination of events indicative of potential danger proximate a user, and combination or sub-combination of these events.

Detection facility 104 may detect an occurrence of a predefined trigger event in any suitable way. For example, detection facility 104 may access and utilize surveillance data acquired by surveillance facility 102 to detect a trigger event. Additionally or alternatively, detection facility 104 may detect an occurrence of a predefined trigger event based on other data.

Detection facility 104 may maintain and use a trigger event detection heuristic to analyze data to determine whether a predefined trigger event has occurred. The trigger event detection heuristic may specify one or more conditions to be satisfied in order for detection facility 104 to determine that a predefined trigger event has occurred. The heuristic may be defined by a user device manufacturer, a service provider, and/or a user as may suit a particular implementation, user device, user, and/or situation.

Management facility 106 may be configured to perform one or more operations for managing surveillance operations, such as performing one or more surveillance management operations in response to one or more trigger events detected by detection facility 104. For example, management facility 106 may be configured to dynamically manage operations of surveillance facility 102, and thereby control the acquisition of surveillance data, in response to one or more trigger events detected by detection facility 104. For instance, in certain examples, management facility 106 may select, from a group of predefined surveillance modes and in response to a trigger event, a particular mode of operation that will govern the acquisition of surveillance data by surveillance facility 102. To illustrate, a group of predefined surveillance modes may include a normal surveillance mode and an enhanced surveillance mode. During normal detected conditions, management facility 106 may direct surveillance facility 102 to operate in accordance with the normal surveillance mode, and surveillance facility 102 may acquire a first set of surveillance data specified for acquisition during operation in accordance with the normal surveillance mode. During operation in accordance with the normal surveillance mode, detection facility 104 may detect an occurrence of a predefined trigger event. In response, management facility 106 may direct surveillance facility 102 to transition from operation in accordance with the normal surveillance mode to operation in accordance with the enhanced surveillance mode, and surveillance facility 102 may acquire a second, enhanced set of surveillance data specified for acquisition during operation in accordance with the enhanced surveillance mode.

As another example, a group of predefined surveillance modes may include a normal surveillance mode and a reduced surveillance mode. During normal detected conditions, management facility 106 may direct surveillance facility 102 to operate in accordance with the normal surveillance mode, and surveillance facility 102 may acquire a first set of surveillance data specified for acquisition during operation in accordance with the normal surveillance mode. During operation in accordance with the normal surveillance mode, detection facility 104 may detect an occurrence of a predefined trigger event. In response, management facility 106 may direct surveillance facility 102 to transition from operation in accordance with the normal surveillance mode to operation in accordance with the reduced surveillance mode, and surveillance facility 102 may acquire a second, reduced set of surveillance data specified for acquisition during operation in accordance with the reduced surveillance mode.

Management facility 106 may perform additional or alternative operations in response to one or more trigger events, including any of the surveillance management operations described herein. For example, as described in more detail herein, management facility 106 may provide a user interface, provide user selectable options, notify one or more preselected users, notify emergency responders, sound an alarm, and/or perform any other operation in response to a trigger event.

In certain embodiments, management facility 106 may be configured to provide an end user with one or more tools for defining or otherwise customizing trigger events, surveillance modes of operation, sets of surveillance data (e.g., specific surveillance data parameters), and/or relationships between the trigger events, surveillance modes of operation, and sets of surveillance data such that detection facility 104 may detect trigger events and management facility 106 may respond to the trigger events in accordance with user preferences.

Storage facility 108 may be configured to store surveillance data 110 collected by surveillance facility 102. Storage facility 108 may be configured to maintain additional and/or alternative data as may suit a particular implementation, including any of the data disclosed herein (e.g., data representative of predefined triggers, a trigger detection heuristic, defined sets of surveillance data parameters, defined surveillance modes of operation, and relationships between these data elements).

Figure 2:
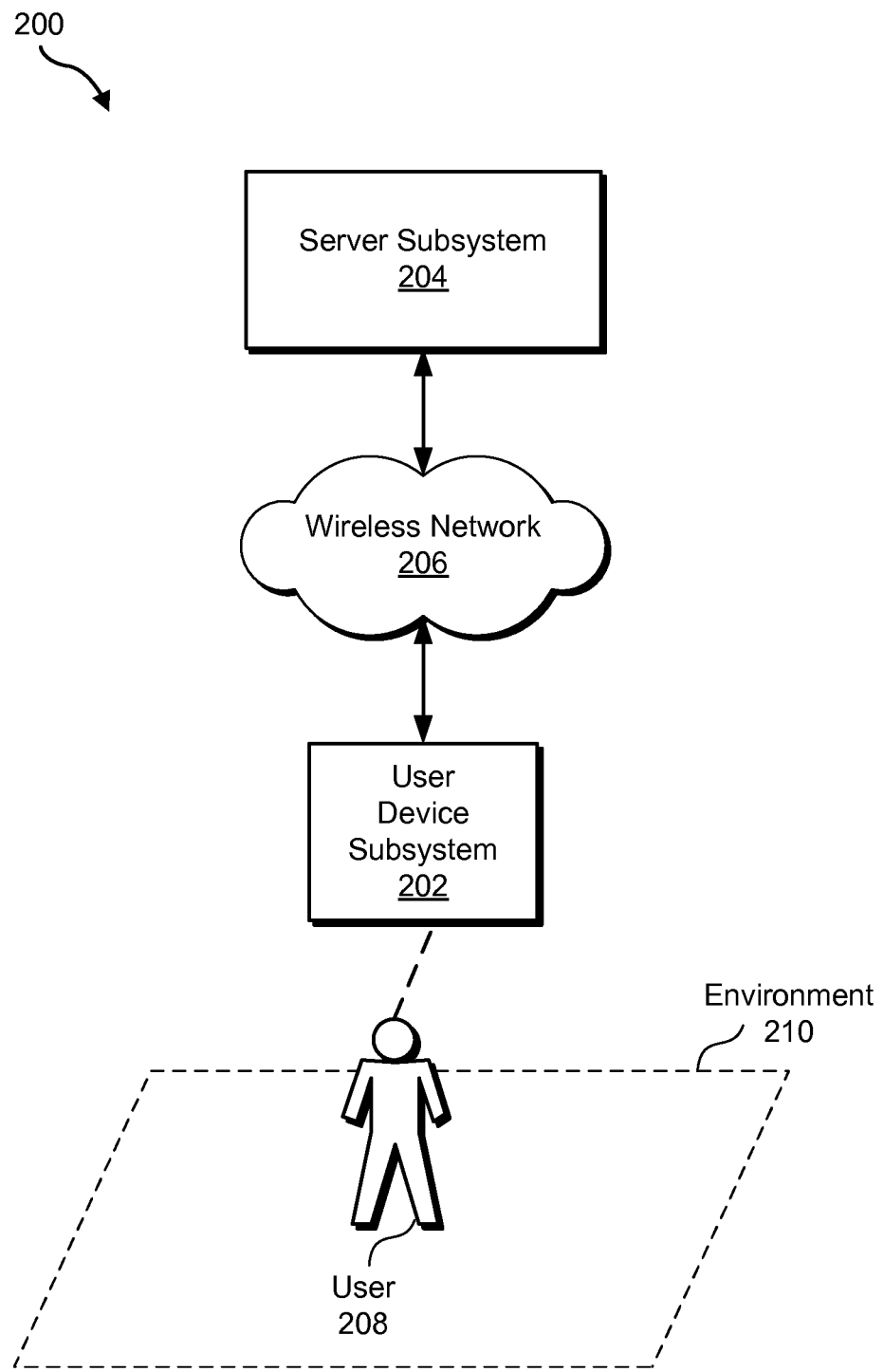
FIG. 2 illustrates an exemplary implementation of the system of FIG. 1 according to principles described herein.

FIG. 2 illustrates an exemplary implementation 200 of system 100 wherein a user device subsystem 202 is communicatively coupled to a server subsystem 204 by way of a wireless network 206. Surveillance facility 102, detection facility 104, management facility 106, and storage facility 108 may each be implemented by user device subsystem 202 and/or server subsystem 204. Accordingly, user device subsystem 202, server subsystem 204, or a combination thereof may perform any of the operations of surveillance facility 102, detection facility 104, management facility 106, and storage facility 108.

As further shown in FIG. 2, user device subsystem 202 may be associated with a user 208. User device subsystem 202 is generally mobile in that it typically moves along with user 208. For example, user device subsystem 202 may be carried by or with user 208. Thus, user device subsystem 202 may be referred to as a personal mobile user device subsystem 202. User 208 is typically an end user of one or more services (e.g., a personal surveillance service, a wireless communication service, a media content distribution service, etc.) accessible via wireless network 206.

User 208 and user device subsystem 202 are typically located within a physical space referred to herein as a user or user device environment 210 (or simply "environment 210"). As mentioned, environment 210 may include an indoor environment such a room of an office building, a home, or other structure, an outdoor environment such as a street, a park, or other location, or any other physical environment within which user 208 and user device subsystem 202 are located. Environment 210 is typically non-static and changes along with a change in location of user 208 and user device subsystem 202.

User device subsystem 202 may be configured to acquire surveillance data within environment 210 in any of the ways described herein, including by acquiring a set of surveillance data in accordance with a select surveillance mode of operation. User device subsystem 202 may include or be implemented by one or more mobile user devices configured to perform the operations of user device subsystem 202. In certain examples, user device subsystem 202 may include a or be implemented by a mobile phone device, tablet computer, handheld media player device, handheld gaming device, camera device (e.g., still-shot and/or video camera), sensor device, or any suitable handheld computing device. In certain examples, user device subsystem 202 may include or be implemented by more than one of each of these devices and/or a combination of any of these devices.

To illustrate, in one example, user device subsystem 202 may include or consist of a mobile phone device associated with user 208. In another example, user device subsystem 202 may include or consist of one or more sensor devices. In another example, user device subsystem 202 may include or consist of a combination of a mobile phone device and one or more separate sensor devices. These examples are illustrative only. Other user device configurations may be implemented in other examples.

Figure 3:
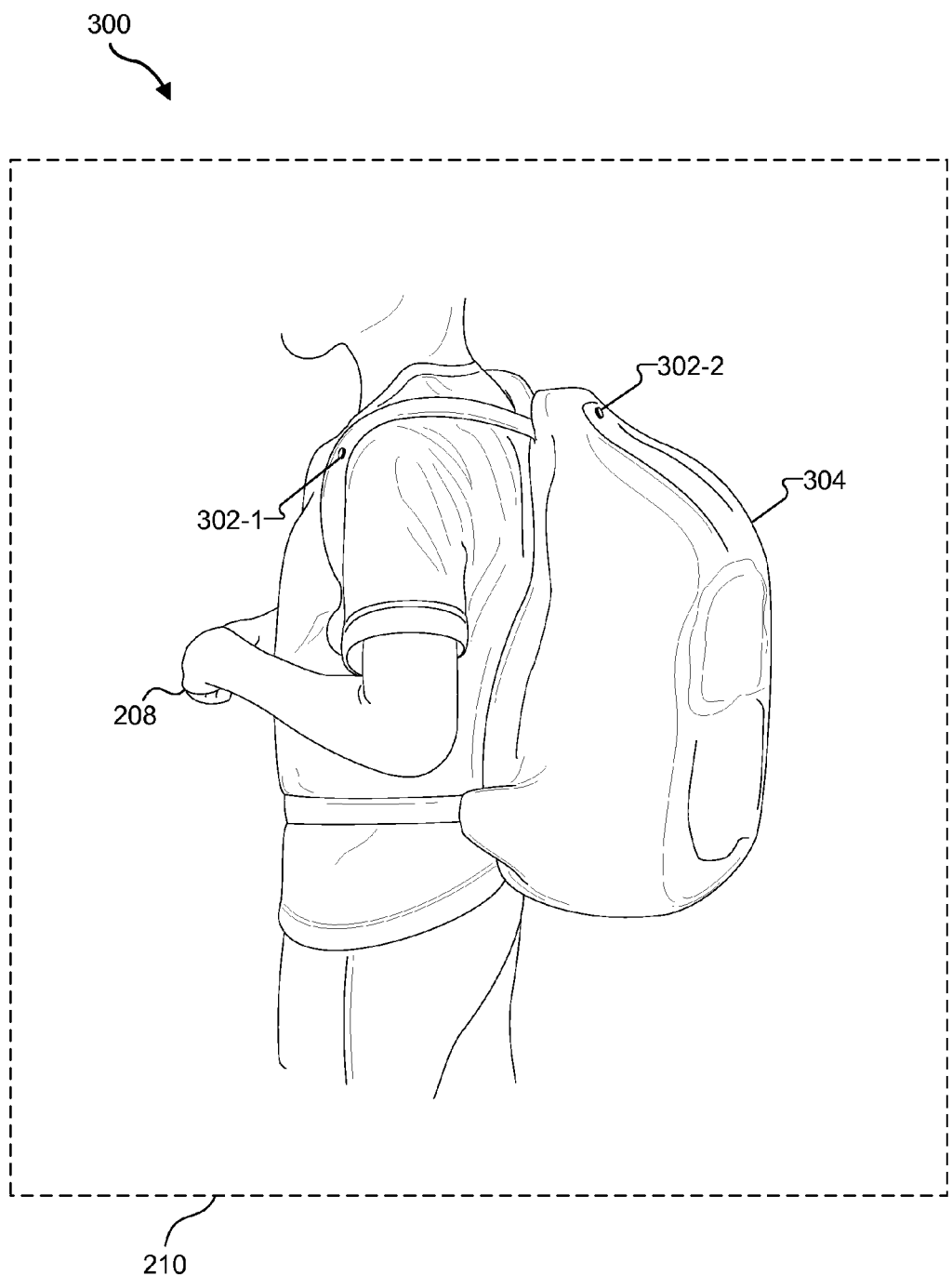
FIG. 3 illustrates an exemplary configuration of user devices according to principles described herein.

FIG. 3 illustrates an example of a particular user device configuration 300 that includes sensor devices 302 (e.g., sensor devices 302-1 and 302-2) attached to a backpack 304 worn by user 208. As shown, sensor devices 302 may be discrete by being small, inconspicuous, and/or not easily recognized. The illustrated configuration 300 is illustrative only. Other configurations of one or more mobile user devices may be employed in other implementations. For example, a discrete sensor device 302 may be integrated into a button, jewelry (e.g., a necklace, bracelet, earring, etc.), a watch, a communications earpiece, glasses, and/or any item of clothing or accessory worn by user 208. As another example, a discrete sensor device 302 may be implemented by a wearable or implantable device such as a pacemaker, hearing aid, prosthetic, pedometer, and/or other similar device.

In certain embodiments, sensor device 302-1 may include a camera configured to capture still-images and/or video of a portion of environment 210 to the front of user 208, and sensor device 302-2 may include a camera configured to capture still-images and/or video of a portion of environment 210 to the back of user 208. Additionally or alternatively, sensor devices 302 may include microphones configured to capture audio in environment 210. Sensor devices 302 may include self-contained power sources such as batteries or may access power from another source (e.g., a battery within backpack 304).

User device subsystem 202 may be configured to locally store, process, and/or transmit acquired surveillance data to server subsystem 204 by way of wireless network 206. In certain examples, one or more user devices included in or implementing user device subsystem 202 may be configured to temporarily or permanently store surveillance data locally, such as for buffering, processing (e.g., encoding, up-converting, etc.), and transmitting acquired surveillance data to server subsystem 204. Transmission of surveillance data from user device subsystem 202 to server subsystem 204 may be performed in real time, in near real time, periodically, in response to an acquisition of surveillance data, when sufficient wireless network resources (e.g., a connection and/or a threshold level of bandwidth) are available, or at any other suitable time.

In certain user device configurations, each of the mobile user devices included in or implementing user device subsystem 202 may be configured to communicate with server subsystem 204 by way of wireless network 206. In other user device configurations, certain user devices (e.g., sensor devices such as sensor devices 302) may not be configured to communicate with server subsystem 204 by way of wireless network 206. Rather, such user devices may be configured to communicate with another user device included in or implemented by user device subsystem 202 (e.g., with a mobile phone device by way of a Bluetooth connection or other suitable connection), and that device may be configured to communicate with server subsystem 204 by way of wireless network 206. For example, sensor devices 302 may capture and transmit surveillance data to another user device, such as a mobile phone device carried with/by user 208, which user device may transmit the surveillance data to server subsystem 204 by way of wireless network 206.

User device subsystem 202 may communicate with server subsystem 204 using any suitable wireless communication technologies, including wireless communication technologies that support delivery of surveillance data from user device subsystem 202 to server subsystem 204 over wireless network 206. Examples of such communication technologies may include, without limitation, Global System for Mobile Communications ("GSM") technologies, Long Term Evolution ("LTE") technologies, Code Division Multiple Access ("CDMA") technologies, Time Division Multiple Access ("TDMA") technologies, Evolution Data Optimized Protocol ("EVDO") (e.g., "1xEVDO"), radio frequency ("RF") signaling technologies, radio transmission technologies (e.g., One Times Radio Transmission Technology ("1xRTT")), Transmission Control Protocol ("TCP"), Internet Protocol ("IP"), Session Initiation Protocol ("SIP"), Real-Time Transport Protocol ("RTP"), User Datagram Protocol ("UDP"), in-band and out-of-band signaling technologies, and other suitable wireless communications technologies, or any combination or sub-combination thereof.

Wireless network 206 may include any wireless network provided by one or more appropriately configured network devices (and communication links thereto) and over which communications and data may be transported between server subsystem 204 and user device subsystem 202. For example, wireless network 206 may include, but is not limited to, a mobile phone network (e.g., a cellular phone network, a 3G network, a 4G network, etc.), a satellite media network (e.g., a broadcasting network, a terrestrial media broadcasting network), a wide area wireless network, and/or any other wireless network capable of transporting communications and data between server subsystem 204 and user device subsystem 202. Wireless network 206 may include multiple cells serving multiple respective geographic locations. The cells may include geographic cells served by respective base stations and cell towers. In certain exemplary implementations, wireless network 206 may comprise an LTE wireless network.

Wireless network 206 may include one or more network devices located at one or more geographic locations (e.g., at one or more cell towers, base stations, etc.) and configured to perform operations to provide for transport of network traffic over wireless network 206. Examples of network devices may include, but are not limited to, routers, switches, gateways, base station equipment, servers, cell tower equipment (e.g., transceivers), and other network node devices.

Server subsystem 204 may include one or more computing devices (e.g., one or more server devices) configured to perform the functionality of server subsystem 204 described herein. The computing devices may include and/or be implemented by one or more network devices of wireless network 206 and/or may be configured to communicate with one or more network devices of wireless network 206. In certain examples, the computing devices may be operated by the operator of wireless network 206 and/or a personal mobile surveillance service provider.

Server subsystem 204 may receive surveillance data from user device subsystem 202 by way of wireless network 206. Server subsystem 204 may process (e.g., decode, down-convert, etc.) and store the surveillance data. Accordingly, surveillance data may be stored remotely from user device subsystem 202 at server subsystem 204, and the remote storage of data may function as a cloud-based "black box" of surveillance data. The remote storage of surveillance data may help to protect the surveillance data from events that may otherwise cause the data to be lost if stored only at user device subsystem 202. Additionally or alternatively, the remote storage of surveillance data may help conserve resources of user device subsystem 202.

User device subsystem 202, server subsystem 204, or a combination of user device subsystem 202 and server subsystem 204 may be configured to detect trigger events and manage acquisition of surveillance data as described herein. In certain examples, user device subsystem 202 may acquire and transmit surveillance data to server subsystem 204, which may be configured to use the surveillance data to detect an occurrence of a trigger event and to manage the acquisition of surveillance data in response to the trigger event by communicating with user device subsystem 202 to govern the acquisition of surveillance data by user device subsystem 202 (e.g., by directing user device subsystem 202 to operate in accordance with a particular surveillance mode of operation). In other examples, user device subsystem 202 may acquire and transmit surveillance data to server subsystem 204. While doing so, user device subsystem 202 may detect an occurrence of a trigger event and manage the acquisition of surveillance data by the user device subsystem 202 in response to the trigger event. For example, in response to the trigger event, user device subsystem 202 may begin operating in accordance with a different surveillance mode of operation and/or begin acquiring and transmitting a different set of surveillance data (a set of surveillance data that is different from a set of surveillance data acquired before the trigger event) to server subsystem 204.

Figure 4:
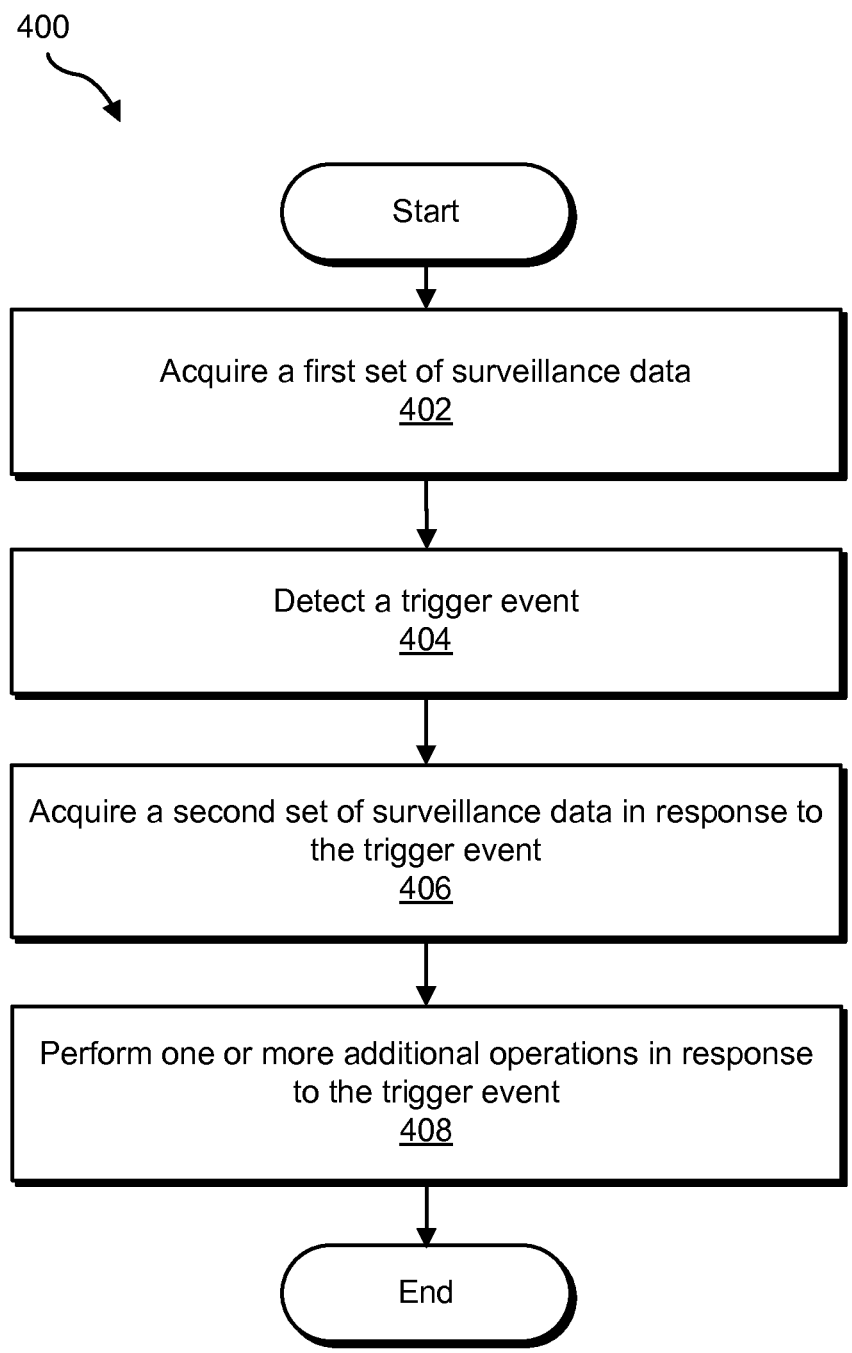
FIG. 4 illustrates an exemplary surveillance method according to principles described herein.

FIG. 4 illustrates and exemplary surveillance method 400 according to principles described herein. While FIG. 4 illustrates exemplary steps according to certain embodiments, other embodiments may omit, add to, reorder, combine, and/or modify any of the steps shown in FIG. 4. In certain embodiments, one or more of the steps shown in FIG. 4 may be performed by system 100, implementation 200, and/or one or more components of system 100 and/or implementation 200.

In step 402, system 100 acquires a first set of surveillance data. For example, during operation of system 100 in accordance with a first surveillance mode, system 100 may acquire the first set of surveillance data in any of the ways described herein.

In step 404, system 100 detects a trigger event. For example, during operation of system 100 in accordance with the first surveillance mode, system 100 may detect an occurrence of a predefined trigger event in any of the ways described herein.

In step 406, system 100 acquires a second set of surveillance data in response to the trigger event. For example, in response to the trigger event, system 100 may transition from operation in accordance with the first surveillance mode to operation in a second surveillance mode. During operation in accordance with the second surveillance mode, system 100 may acquire the second set of surveillance data in any of the ways described herein.

In step 408, system 100 performs one or more additional operations in response to the trigger event detected in step 404. For example, if the trigger event is indicative of potential danger to a user, system 100 may perform one or more operations that may attempt to help the user (e.g., help protect the user from the potential danger). Examples of such operations include, without limitation, alerting an emergency responder (e.g., by transmitting a message to security personnel, a police department, a fire department, etc.), alerting one or more preselected persons associated with the user (e.g., by transmitting a message to one or more parents or friends of the user), transmitting surveillance data to one or more preselected persons, alerting one or more other users located physically proximate to a user that a potential emergency situation exists nearby (e.g., by transmitting alert messages such as "someone near you is in distress") to one or more user devices located physically proximate to a user device), pinging off of one or more devices located physically proximate to a user device to obtain data helpful for locating a user device and/or improving accuracy and/or reliability of location data for the user device, transmitting a general distress message (e.g., a locator beacon message) that may be received my one or more devices located proximate to user device, directing a user device associated with the user to perform one or more operations such as playing back an alarm and/or warning message (e.g., "police have been called"), providing user selectable options that when selected will cause a user device to initiate an emergency call or send an emergency message, and performing any other operation that may potentially help the user.

As another example, if the trigger event detected in step 404 is indicative of low system resources, system 100 may perform one or more operations in step 408 to address the low resource situation. For example, system 100 may cause a user device associated with a user to pause or terminate one or more processes operating on the user device to ensure that system 100 has sufficient resources to perform one or more of the surveillance operations described herein. To illustrate, if network bandwidth is low, system 100 may interrupt an upload of non-surveillance data from the user device to ensure that sufficient network bandwidth is available for transmitting surveillance data to server subsystem 204. As an additional illustration, if battery power is low, system 100 may terminate a process running on the user device to conserve the remaining battery power for surveillance operations. Additionally or alternatively, system 100 may prioritize surveillance operations such as by prioritizing which surveillance data parameters to acquire. For instance, acquisition of GPS coordinate data may be prioritized over acquisition of video data.

The above description of method 400 is directed generally to switching from acquisition of a first set of surveillance data to acquisition of a second set of surveillance data in response to a detection of a trigger event. In certain implementations of method 400, specific sets of surveillance data and/or trigger events may be defined and employed as may suit the particular implementations. Examples of such specific implementations will now be described.

In certain implementations, the second set of data may be an enhanced set of data compared to the first set of data. The second set of data may be enhanced in that it represents values for a more robust set of surveillance parameters and/or data points than the set of surveillance parameters and/or data points represented by the first set of data. For example, if the trigger event is indicative of potential danger to a user, system 100 may switch from acquiring the first set of surveillance data to acquiring the second, enhanced set of surveillance data, thereby allowing more information to be acquired in response to detection of potential danger to the user. For instance, the user may be a child walking home from school. System 100 may detect a trigger event indicative of potential danger to the child (e.g., a yell for "help," a jolt to a user device that may be indicative of a fall of the child or a drop of the user device, the child providing user input to activate an enhanced surveillance mode, etc.) and may respond by acquiring a more enhanced set of surveillance data.

Figure 5:
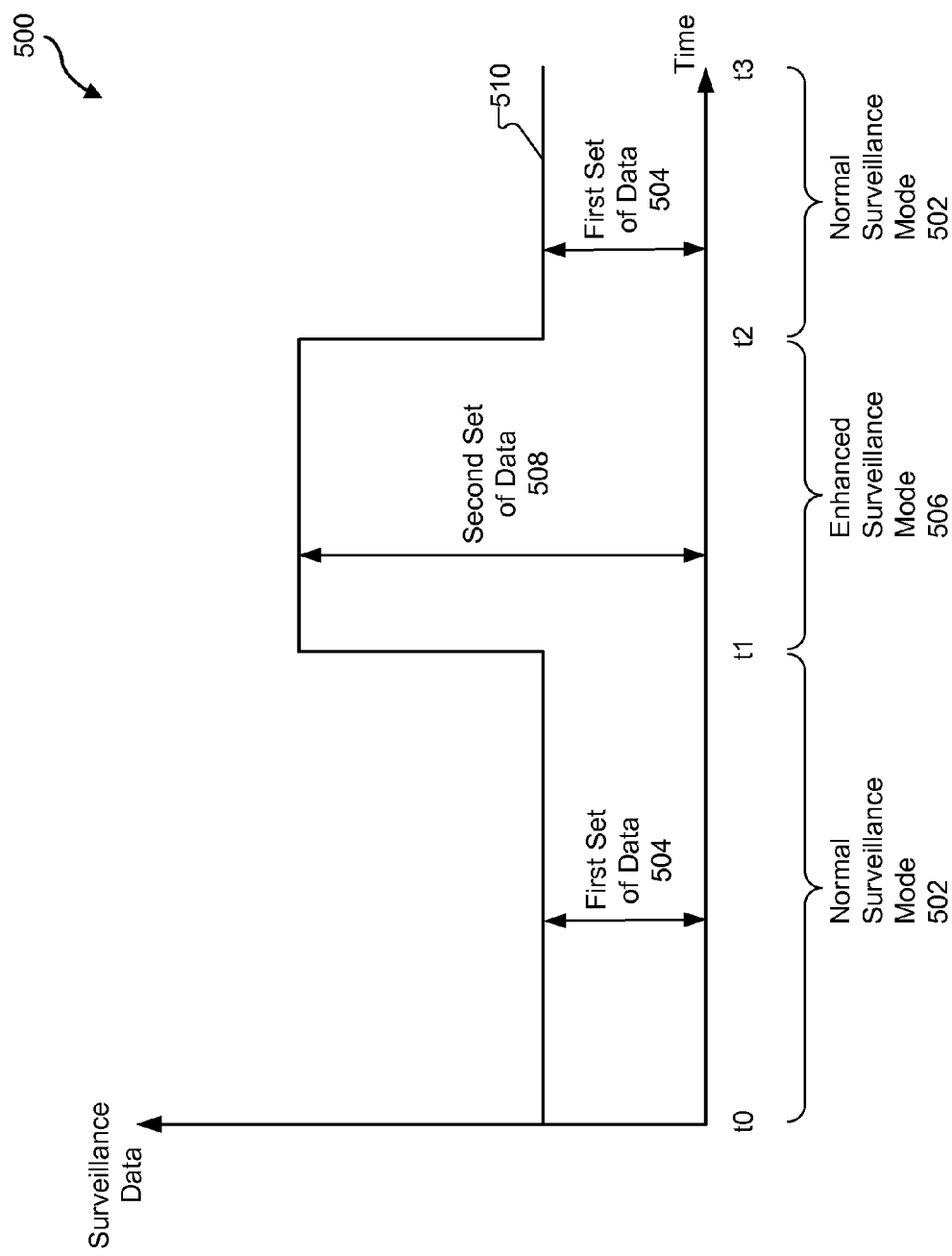
FIG. 5 illustrates a graph showing acquired surveillance data plotted against time according to principles described herein.

FIG. 5 illustrates a graph 500 showing surveillance data (vertical axis) plotted against time (horizontal axis). During a time period between time t0 and time t1 shown in FIG. 5, system 100 may operate in a normal surveillance mode 502 and acquire a first set of surveillance data 504 associated with normal surveillance mode 502. At time t1, system 100 may detect a trigger event and respond by transitioning from operation in normal surveillance mode 502 to operation in an enhanced surveillance mode 506. During a time period between time t1 and time t2 shown in FIG. 5, system 100 may operate in enhanced surveillance mode 506 and acquire a second set of surveillance data 508 associated with enhanced surveillance mode 506. At time t2, system 100 may detect an additional trigger event and respond by transitioning from operation in enhanced surveillance mode 506 back to operation in normal surveillance mode 502. During a time period between time t2 and time t3 shown in FIG. 5, system 100 may again operate in normal surveillance mode 502 and acquire the first set of surveillance data 504 associated with normal surveillance mode 502.

The duration of the time period between time t1 and time t2 may be any suitable length of time. To this end, any suitable trigger event may be defined to govern when system 100 returns from operation in enhanced surveillance mode 506 to operation in normal surveillance mode 502. Examples of such trigger events include, without limitation, an end of a preset length of time, a detected end of anomalistic activity of a user or user device (e.g., an end of anomalistic inactivity of a user or user device such as a return of the user to a regular travel route, resumed normal usage of the user device, resumed normal movement of the user or user device), any event indicative of an end or absence of potential danger proximate a user, and/or any other suitable event.

To illustrate, in certain examples, system 100 may be configured to operate in enhanced surveillance mode 506 only for a length of time sufficient for acquiring a snapshot of the second set of surveillance data 508. The snapshot may include values of a set of surveillance data parameters at a given time or length of time. After the second set of surveillance data 508 is acquired, system 100 may transition back to operation in normal surveillance mode 502. In such a configuration, each event that triggers operation in enhanced surveillance mode 506 may trigger acquisition of second set of data 508 and then automatically revert back to operation in normal surveillance mode 502 after the second set of data 508 is acquired.

In other examples, system 100 may be configured to operate in enhanced surveillance mode 506 indefinitely until an additional trigger event is detected and system 100 transitions back to operation in normal surveillance mode 502.

In other examples, the duration that system 100 operates in enhanced surveillance mode 506 may depend on the particular trigger event that triggered the operation in enhanced surveillance mode 506. For example, in response to detection of anomalistic inactivity of a user device, system 100 may operate in enhanced surveillance mode 506 for a predetermined duration of time. In contrast, in response to detection of a yell for "help" in environment 210, system 100 may operate in enhanced surveillance mode 506 indefinitely until an additional trigger event that is indicative of an absence of potential danger to a user is detected.

The acquisition of the second set of surveillance data 508 may consume more system resources than are consumed by the acquisition of the first set of surveillance data 504. To illustrate, plotted line 510 shown in FIG. 5 may represent an amount of surveillance data acquired and/or an amount of system resources used to acquire the surveillance data over time. For example, the first set of surveillance data 504 may include acquired values for a first set of surveillance data parameters and/or data points, and the second set of surveillance data 508 may include acquired values for a second, more robust set of surveillance data parameters and/or data points.

The example shown in FIG. 5 is illustrative only. Surveillance data may be acquired differently over time in other examples. For example, surveillance data may be intermittently acquired at predefined time intervals in normal surveillance mode 502, enhanced surveillance mode 506, and/or any other surveillance mode of operation. This allows for a snapshot of surveillance data parameters associated with a surveillance mode of operation to be acquired. Time intervals for acquisition of snapshot data may be defined as may suit a particular implementation and/or surveillance mode of operation. For example, surveillance data snapshots may be acquired more frequently in enhanced surveillance mode 506 than in normal surveillance mode 502.

FIG. 6 illustrates a table 600 listing exemplary sets of surveillance data. Row 602-1 lists a pairing of two exemplary sets of surveillance data—a first set of surveillance data 604-1 and a second set of surveillance data 606-1. The first set of surveillance data 604-1 may include periodically acquired GPS parameters of a user device, and the second set of surveillance data 606-1 may include continuously acquired GPS parameters. Row 602-2 lists another pairing of two exemplary sets of surveillance data—a first set of surveillance data 604-2 and a second set of surveillance data 606-2. The first set of surveillance data 604-2 may include periodically acquired still-shot camera images of an environment of a user device, and the second set of surveillance data 606-2 may include continuous video images (e.g., a video clip or snippet) of the environment of the user device. Row 602-3 lists another pairing of two exemplary sets of surveillance data—a first set of surveillance data 604-3 and a second set of surveillance data 606-3. The first set of surveillance data 604-3 may include user device status data, and the second set of surveillance data 606-3 may include the same user device status data and user environment data (e.g., video, photo, and/or audio data of conditions of an environment of a user device). Row 602-4 lists another pairing of two exemplary sets of surveillance data—a first set of surveillance data 604-4 and a second set of surveillance data 606-4. The first set of surveillance data 604-4 may include user device status data and user condition data (e.g., biometric data of a user), and the second set of surveillance data 606-4 may include the same user device status data and user condition data, as well as user environment data (e.g., video, photo, and/or audio data of conditions of an environment of a user device).

In the examples shown in FIG. 6, each second set of surveillance data 606 may include an enhanced, more robust set of data compared to each paired first set of surveillance data 604. Accordingly, acquisition of each second set of surveillance data 606 typically consumes more system resources than are consumed by acquisition of each paired first set of surveillance data 604.

The exemplary sets of surveillance data and pairings of sets of surveillance data shown in FIG. 6 are illustrative only. Other sets of surveillance data and relationships between sets of surveillance data may be defined and employed in other implementations.

Returning to FIG. 4, in certain implementations, the second set of data may be a reduced set of data compared to the first set of data. The second set of data acquired in step 406 may be a reduced set of surveillance data in that it represents values for a less robust set of surveillance parameters and/or data points than the set of surveillance parameters and/or data points represented by the first set of surveillance data. For example, if the trigger event is indicative of low system resources (e.g., low battery power of a user device), system 100 may switch from acquiring the first set of surveillance data to acquiring the second, reduced set of surveillance data, thereby conserving resources in response to detection of a low resource condition of system 100.

Figure 7:
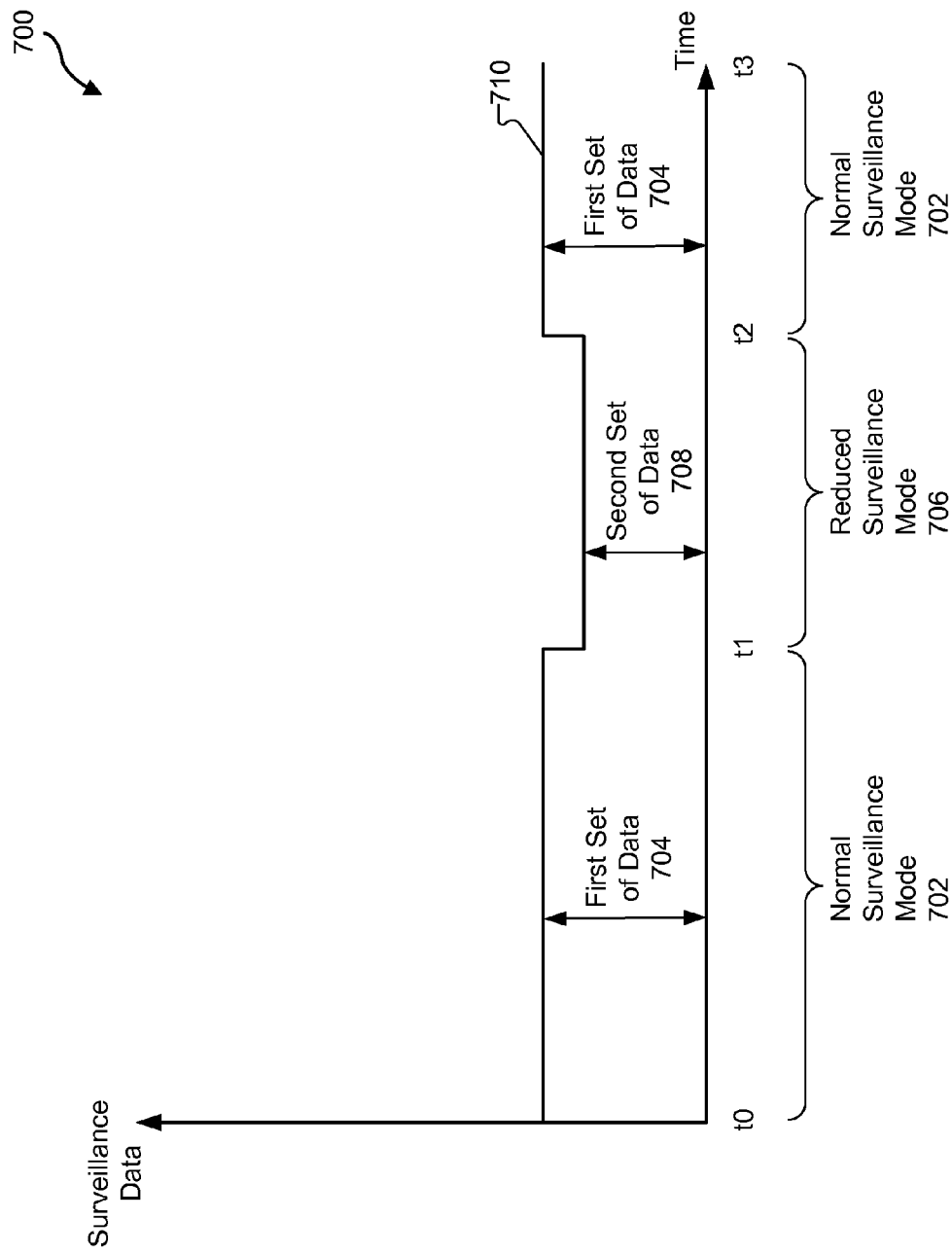
FIG. 7 illustrates another graph showing acquired surveillance data plotted against time according to principles described herein.

FIG. 7 illustrates a graph 700 showing surveillance data (vertical axis) plotted against time (horizontal axis). During a time period between time t0 and time t1 shown in FIG. 7, system 100 may operate in a normal surveillance mode 702 and acquire a first set of surveillance data 704 associated with normal surveillance mode 702. At time t1, system 100 may detect a trigger event and respond by transitioning from operation in normal surveillance mode 702 to operation in a reduced surveillance mode 706. During a time period between time t1 and time t2 shown in FIG. 7, system 100 may operate in reduced surveillance mode 706 and acquire a second set of surveillance data 708 associated with reduced surveillance mode 706. At time t2, system 100 may detect an additional trigger event and respond by transitioning from operation in reduced surveillance mode 706 back to operation in normal surveillance mode 702. During a time period between time t2 and time t3 shown in FIG. 7, system 100 may again operate in normal surveillance mode 702 and acquire the first set of surveillance data 702 associated with normal surveillance mode 702.

The duration of the time period between time t1 and time t2 may be any suitable length of time. To this end, any suitable trigger event may be defined to govern when system 100 returns from operation in reduced surveillance mode 706 to operation in normal surveillance mode 702. Examples of such trigger events include, without limitation, a detected increase in availability of system resources and/or any other suitable event.

The acquisition of the second set of surveillance data 708 may consume less system resources than are consumed by the acquisition of the first set of surveillance data 704. To illustrate, plotted line 710 shown in FIG. 7 may represent an amount of surveillance data acquired and/or an amount of system resources used to acquire the surveillance data over time. For example, the first set of surveillance data 704 may include acquired values for a first set of surveillance data parameters and/or data points, and the second set of surveillance data 708 may include acquired values for a second, less robust set of surveillance data parameters and/or data points. In certain examples, the reduced set of surveillance data may include a subset of the first set of surveillance data in which one or more parameters in the first set of surveillance data has been prioritized and one or more low priority parameters omitted from the reduced set of surveillance data.

The example shown in FIG. 7 is illustrative only. Surveillance data may be acquired differently over time in other examples. For example, surveillance data may be intermittently acquired at predefined time intervals in normal surveillance mode 702, reduced surveillance mode 706, and/or any other surveillance mode of operation. This allows for a snapshot of surveillance data parameters associated with a surveillance mode of operation to be acquired. Time intervals for acquisition of snapshot data may be defined as may suit a particular implementation and/or surveillance mode of operation. For example, surveillance data snapshots may be acquired more frequently in normal surveillance mode 702 than in reduced surveillance mode 706.

FIG. 8 illustrates a table 800 listing exemplary sets of surveillance data. Row 802-1 lists a pairing of two exemplary sets of surveillance data—a first set of surveillance data 804-1 and a second set of surveillance data 806-1. The first set of surveillance data 804-1 may include continuously acquired GPS parameters of a user device, and the second set of surveillance data 806-1 may include periodically acquired GPS parameters. Row 802-2 lists another pairing of two exemplary sets of surveillance data—a first set of surveillance data 804-2 and a second set of surveillance data 806-2. The first set of surveillance data 804-2 may include continuous video images of an environment of a user device, and the second set of surveillance data 806-2 may include periodically acquired still-shot camera images of the environment of the user device. Row 802-3 lists another pairing of two exemplary sets of surveillance data—a first set of surveillance data 804-3 and a second set of surveillance data 806-3. The first set of surveillance data 804-3 may include user device status data, and the second set of surveillance data 806-3 may include only a subset of the user device status data, such as GPS parameters of a user device.

In the examples shown in FIG. 8, each second set of surveillance data 806 may include a reduced, less robust set of data compared to each paired first set of surveillance data 804. Accordingly, acquisition of each second set of surveillance data 806 typically consumes less system resources than are consumed by acquisition of each paired first set of surveillance data 804.

The exemplary sets of surveillance data and pairings of sets of surveillance data shown in FIG. 8 are illustrative only. Other sets of surveillance data and relationships between sets of surveillance data may be defined and employed in other implementations.

As mentioned, system 100 may perform one or more operations to attempt to help protect a user from potential danger. For example, system 100 may provide a user with a user interface and selectable options within the user interface that allow the user to activate one or more functions of system 100. To illustrate, FIGS. 9-10 show exemplary views of a personal surveillance graphical user interface ("GUI") 900 that may be displayed by a mobile user device associated with a user.

Figure 9:
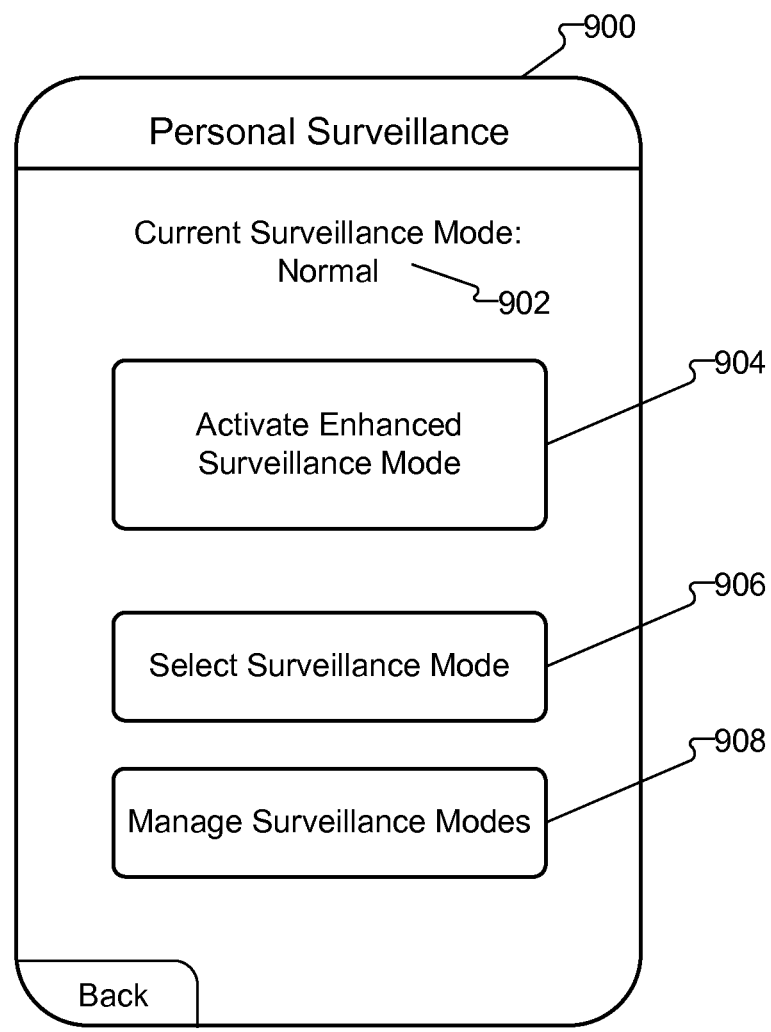
FIGS. 9-10 illustrate exemplary views of a graphical user interface according to principles described herein.

In FIG. 9, GUI 900 indicates the current surveillance mode of operation (e.g., "normal" surveillance mode). In addition, GUI 900 includes user selectable options including an option 904 that may be selected to activate operation in accordance with an enhanced surveillance mode. Accordingly, in response to a user selection of option 904, system 100 may transition from a different current surveillance mode of operation to an enhanced surveillance mode (e.g., an emergency surveillance mode). To illustrate, before a user enters into a potentially dangerous location or situation, the user may select option 904 to activate operation of system 100 in the enhanced surveillance mode in order to acquire a more robust set of surveillance data (e.g., a set of surveillance data than includes captured audio and/or video of the user's environment).

As shown in FIG. 9, GUI 900 may further include user selectable options 906 and 908. In response to a user selection of option 906, system 100 may provide additional options that allow the user to select, from a group of surveillance modes of operation, a particular surveillance mode in which system 100 will operate. In response to a user selection of option 908, system 100 may provide one or more tools that may be used by the user to manage surveillance modes, such as by editing settings of the modes to define or modify surveillance data parameters and/or trigger events associated with the surveillance modes.

Figure 10:
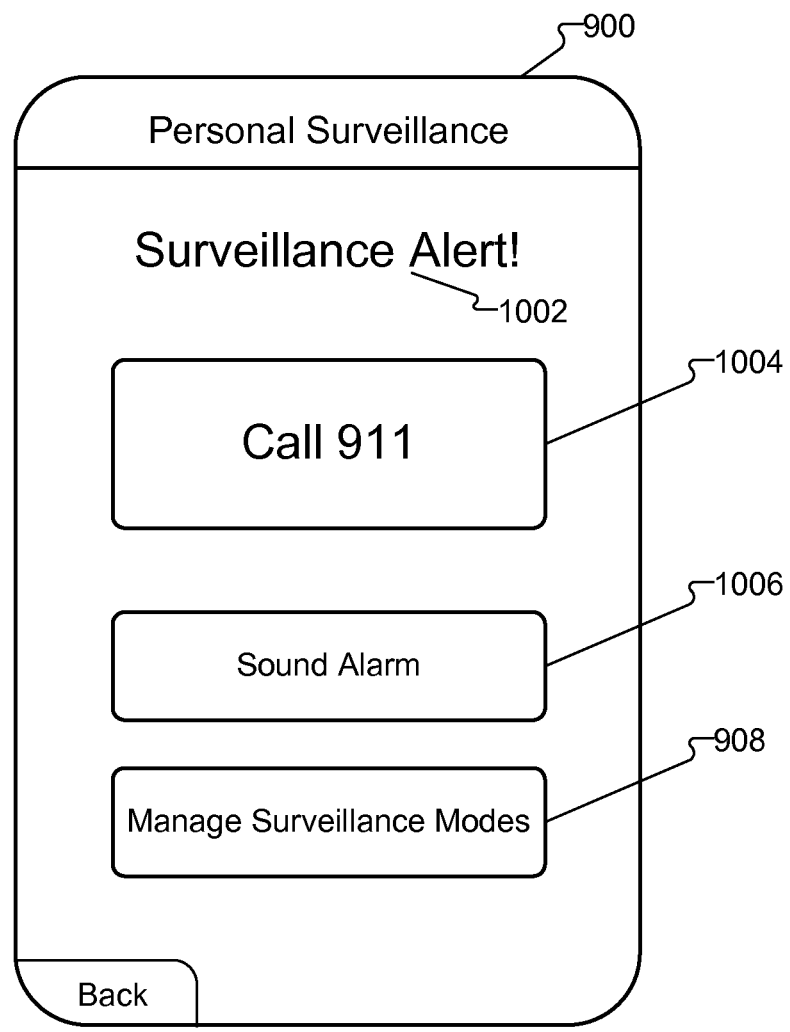

In FIG. 10, GUI 900 includes an indicator 1002 indicating a surveillance alert. A surveillance alert may be triggered by detection of any of the trigger events disclosed herein that may indicate potential danger proximate a user. In addition to indicating that a surveillance alert has been triggered, system 100 may provide one or more user selectable options. For example, GUI 900 includes a user selectable option 1004 for initiating an emergency phone call (e.g., a "911" call). In response to a user selection of option 1004, system 100 may initiate an emergency call. GUI 900 may additionally or alternatively include a user selectable option 1006 for sounding an alarm. In response to a user selection of option 1006, system 100 may sound an alarm. For example, a mobile user device may sound an audible alarm such as an audible indication that "police have been called" or an audible siren sound. Options 1004 and 1006 may provide a convenient way for a user to initiate operations of system 100 may be potentially helpful to the user if faced with danger. As shown in FIG. 10, GUI 900 may further include user selectable option 908, which may function as described above.

System 100 may perform one or more additional or alternative operations to attempt to help protect a user from potential danger. For example, system 100 may detect a trigger event associated with a particular user device and indicative of potential danger to a user of the user device. In response, system 100 may transition to operation in accordance with an enhanced, emergency surveillance mode in which enhanced surveillance data is acquired. While operating in this mode, system 100 may determine one or more other devices that are located physically proximate to the user device. For example, system 100 may identify any user devices that are located within a predetermined distance of the user device, within the same network cell as the user device (e.g., within the same wireless network cell), at the same location as the user device (e.g., traveling on the same road, at the same premises, in the same city, etc.). System 100 may then send alert messages to the identified user devices to notify the users of the user devices that there is potential danger nearby and/or that someone nearby may be in distress. Accordingly, the user of the user devices may become more vigilant and may be able to protect themselves and/or help someone nearby who is in distress (e.g., a child who is the target of a kidnapper).

To illustrate another example, in response to a trigger event indicative of potential danger, system 100 may initiate one or more location determination operations that may be helpful to identify and/or pinpoint the physical location of a user device. For example, system 100 may transmit one or more ping signals and to use these signals and/or ping response signals received back from one or more devices to provide an improved fix on the location of the user device. To illustrate, one or more devices may be located proximate to the user device and may be configured to receive local ping signals (e.g., beacon locator signals) transmitted by the user device. The user devices may forward the ping signals and/or information related to the ping signals to server subsystem 204 for use in pinpointing the physical location of the user device. Additionally or alternatively, server subsystem 204 may instruct one or more user devices located proximate to a user device to transmit ping signals and await a response from the user device. The user devices may forward the response and/or information related to the responses to server subsystem 204 for use in pinpointing the physical location of the user device. User devices located physically proximate to a user device may include other user devices (e.g., mobile phones with GPS capabilities) and/or other devices (e.g., an NFC device at a retailer). For example, a kidnapped child may have a user device 302 operating in an emergency mode and that is transmitting one or more alert messages. The user device 302 may be carried physically proximate to an NFC device of a retailer such that the NFC device receives and forwards the alert messages and/or surveillance data provided by the user device 302 to server subsystem 204 and/or one or more other devices to provide an alert and/or information related to the location of the user device 302.

Figure 11:
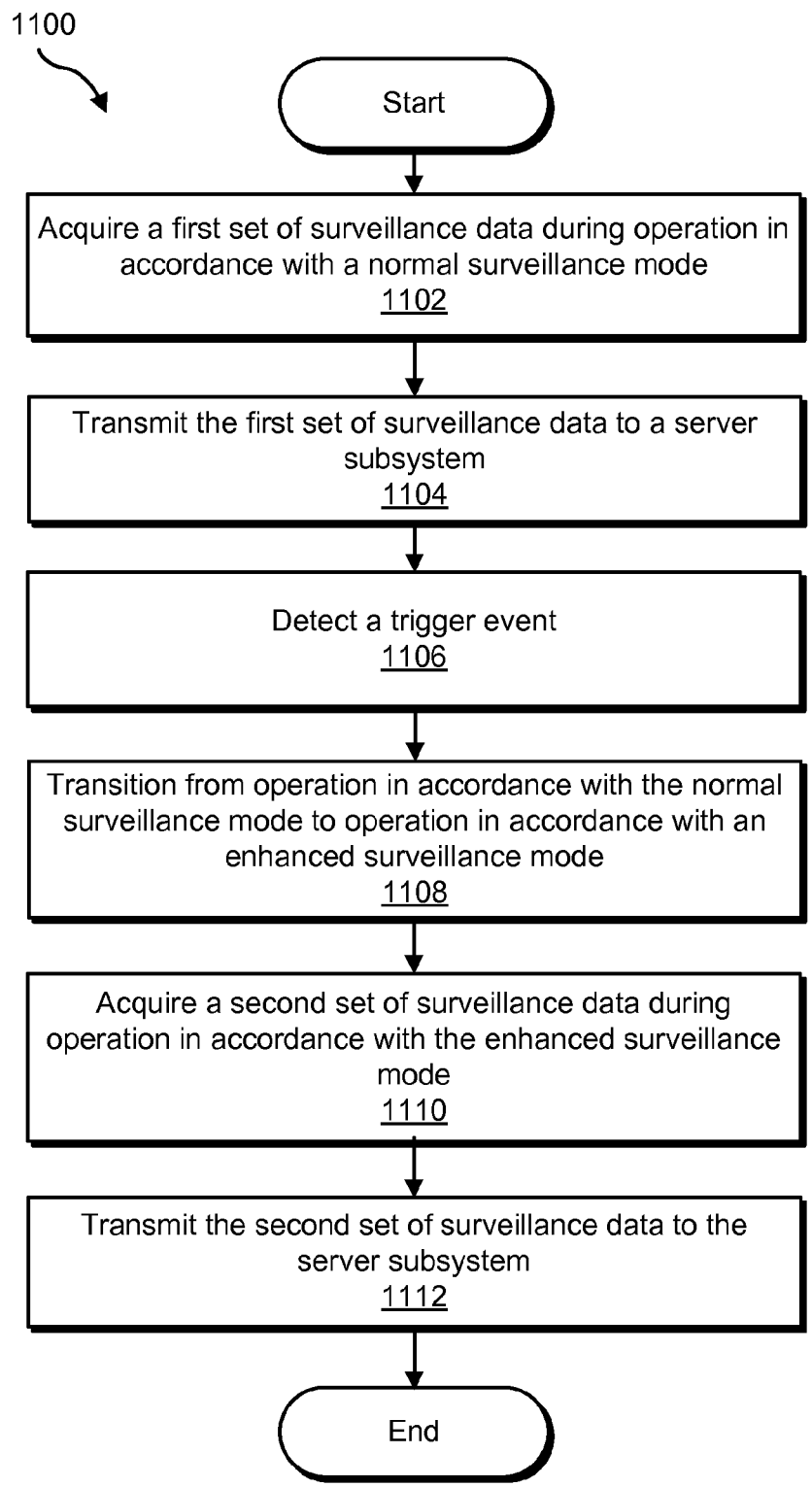
FIGS. 11-12 illustrate additional exemplary surveillance methods according to principles described herein.

FIG. 11 illustrates an exemplary surveillance method 1100. While FIG. 11 illustrates exemplary steps according to certain embodiments, other embodiments may omit, add to, reorder, combine, and/or modify any of the steps shown in FIG. 11. In certain embodiments, one or more of the steps shown in FIG. 11 may be performed by user device subsystem 202.

In step 1102, user device subsystem 202 acquires a first set of surveillance data during operation in accordance with a normal surveillance mode, such as described herein.

In step 1104, user device subsystem 202 transmits the acquired first set of surveillance data to a server subsystem such as server subsystem 204, such as described herein.

In step 1106, user device subsystem 202 detects a trigger event, such as described herein. In certain examples, the triggered event may be indicative of potential danger to a user of user device subsystem 202.

In step 1108, in response to the detection of the trigger event in step 1106, user device subsystem 202 transitions from operation in accordance with the normal surveillance mode to operation in accordance with an enhanced surveillance mode, such as described herein.

In step 1110, user device subsystem 202 acquires a second set of surveillance data during operation in accordance with the enhanced surveillance mode, such as described herein. As described herein, the second set of surveillance data may be enhanced compared to the first set of surveillance data. For example, the second set of surveillance data may include values for more parameters than are included in the first set of surveillance data.

In step 1112, user device subsystem 202 transmits the second set of surveillance data to the server subsystem, such as described herein.

Method 1100 is directed to an example in which user device subsystem 202 locally detects a trigger event and initiates transition of operation in accordance with a normal surveillance mode to operation in accordance with an enhanced surveillance mode. In other embodiments, server subsystem 204 may be configured to detect a trigger event and initiate a transition between surveillance modes of operation.

Figure 12:
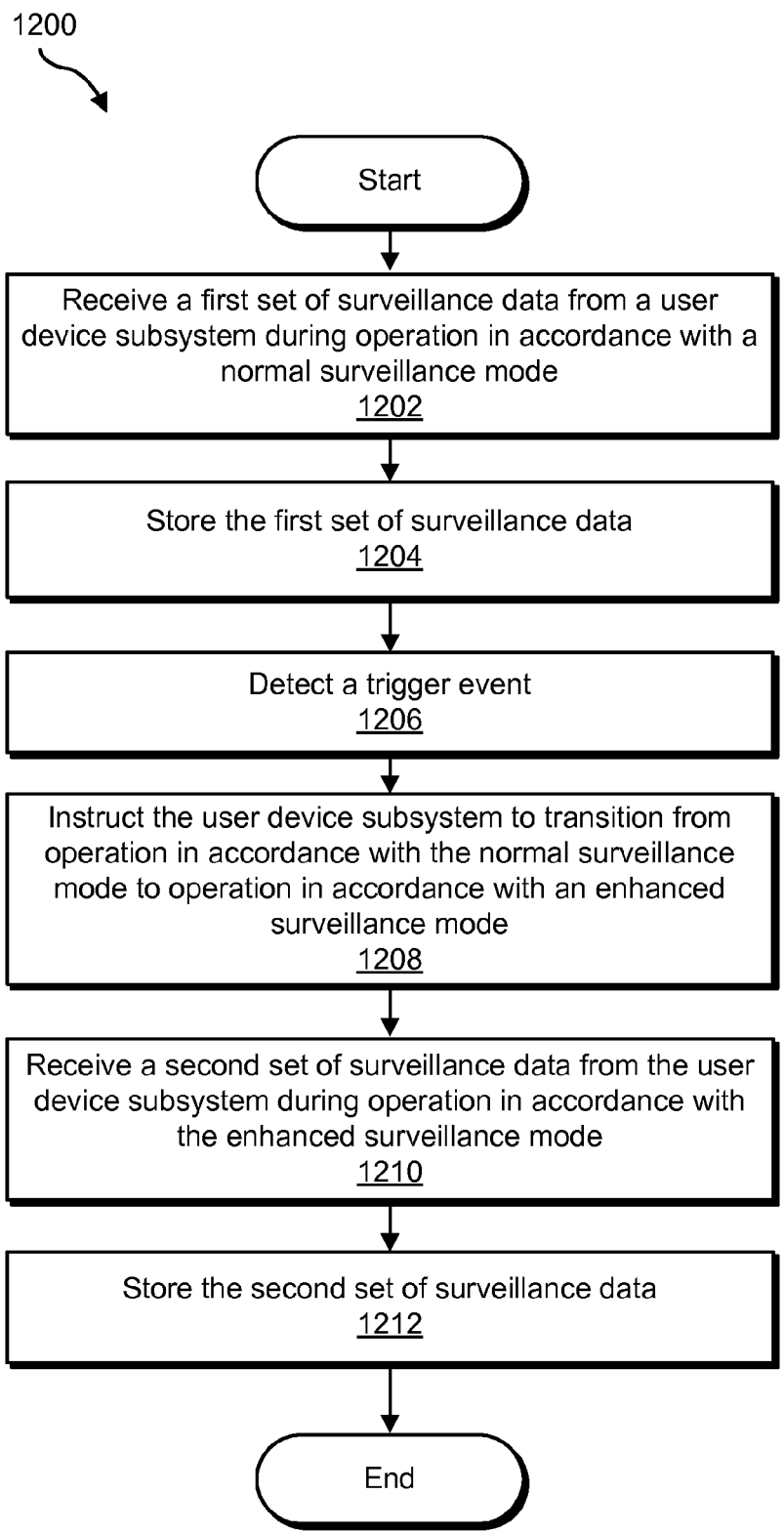

For example, FIG. 12 illustrates an exemplary surveillance method 1200 that may be performed by server subsystem 204. While FIG. 12 illustrates exemplary steps according to certain embodiments, other embodiments may omit, add to, reorder, combine, and/or modify any of the steps shown in FIG. 12.

In step 1202, server subsystem 204 receives a first set of surveillance data from a user device subsystem, such as user device subsystem 202, during operation in accordance with a normal surveillance mode, such as described herein.

In step 1204, server subsystem 204 stores the first set of surveillance data. The first set of surveillance data is stored remote from the user device subsystem.

In step 1206, server subsystem 204 detects a trigger event. For example, server subsystem 204 may analyze the first set of surveillance data and, based on the analysis, detect an occurrence of a trigger event.

In step 1208, server subsystem 204 instructs the user device subsystem to transition from operation in accordance with the normal surveillance mode to operation in accordance with an enhanced surveillance mode. The user device subsystem may respond to the instruction by making the transition.

In step 1210, server subsystem 204 receives a second set of surveillance data from the user device subsystem during operation in accordance with the enhanced surveillance mode.

In step 1212, server subsystem stores the second set of surveillance data. The second set of surveillance data is stored remotely from the user device subsystem.

While methods 1100 and 1200 are described in relation to transition from operation in accordance with a normal surveillance mode to operation in accordance with an enhanced it to surveillance mode, one or more of the principles of methods 1100 and 1200 may similarly apply to transitions between different surveillance modes of operation (e.g., from a normal surveillance mode of operation to a reduced surveillance mode of operation, from an enhanced surveillance mode of operation to a reduced surveillance mode of operation, etc.).

In certain implementations, server subsystem 204 may be configured to perform one or more additional operations based on aggregate surveillance data received from a plurality of user devices subsystems 202 associated with a plurality of users. For example, server subsystem 204 may receive and aggregate surveillance data from a plurality of user devices subsystems 202 associated with a plurality of users, and analyze the aggregate data to detect a mass emergency.

Figure 13:
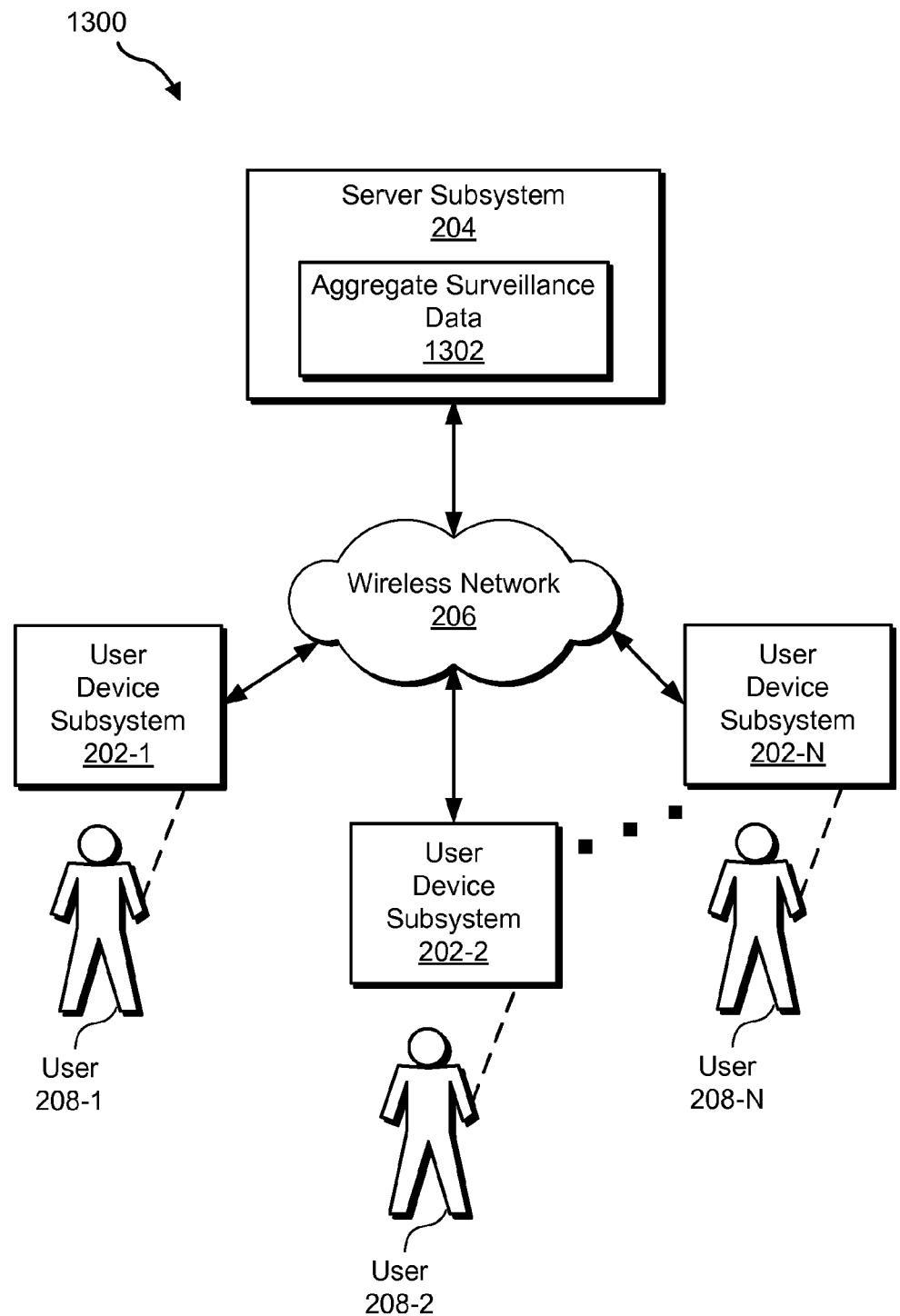
FIG. 13 illustrates another exemplary implementation of the system of FIG. 1 according to principles described herein.

To illustrate, FIG. 13 shows another exemplary implementation 1300 of system 100, wherein a plurality of user device subsystems 202 (e.g., user device subsystems 202-1 through 202-N) respectively associated with a plurality of users 208 (e.g., users 208-1 through 208-N) are configured to acquire and transmit surveillance data to server subsystem 204 by way of wireless network 206. Server subsystem 204 may aggregate and store the surveillance data as aggregate data 1302.

When a localized emergency event occurs, a subset of the user device subsystems 202 that are located proximate the emergency event may detect trigger events and transition from normal surveillance mode to enhanced surveillance mode, as described herein. Server subsystem 204 may detect such transitions, determine that the transitions occurred at a common time (e.g., at substantially the same time or within a threshold length of time), compare the locations of the transitioning user device subsystems 202, and determine that the transitioning user device subsystems 202 are located at a common physical location (e.g., geographically proximate to one another). For example, server subsystem 204 may detect that multiple user device subsystems 202 each located along the same street, within the same structure, within the same wireless network cell, or at another common physical location have concurrently transitioned to an enhanced surveillance mode. From this, server subsystem 204 may determine that a mass emergency may exist at the common location (e.g., an emergency event affecting multiple people has may have occurred at or near the location).

In response to such a determination, server subsystem 204 may perform one or more operations, such as operations that may attempt to help users located proximate the emergency event and/or users who are associated with users located proximate the emergency event. For example, server subsystem 204 may transmit alert messages to user device subsystems 202 associated with users located proximate the emergency event. In certain embodiments, such an alert message may be configured to cause a user device subsystem 202 to automatically transition to operation in an enhanced surveillance mode. Additionally or alternatively, server subsystem 204 may transmit alert messages to user device subsystems 202 associated with users who are associated with users located proximate the emergency event (e.g., parents and/or designated emergency contacts of the users). Additionally or alternatively, server subsystem 204 may be configured to automatically notify an emergency response organization, a governmental organization, a news organization, law enforcement personnel, and/or any other person or organization that may benefit from knowledge of a mass emergency event or help users who may be affected by a mass emergency. Additionally or alternatively, server subsystem 204 may be configured to control one or more parameters of wireless network 206 to conserve network resources for uses related to responding to the emergency event.

In certain embodiments, one or more of the components and/or processes described herein may be implemented and/or performed by one or more appropriately configured computing devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing device or may be implemented on more than one physical computing device. Accordingly, system components may include any number of computing devices, and may employ any of a number of computer operating systems.

In certain embodiments, one or more of the processes described herein may be implemented at least in part as instructions executable by one or more computing devices. In general, a processor (e.g., a microprocessor) receives instructions, from a tangible computer-readable medium, (e.g., a memory, etc.), and executes those instructions, thereby performing one or more processes, including one or more of the processes described herein. Such instructions may be stored and/or transmitted using any of a variety of known non-transitory computer-readable media.

A non-transitory computer-readable medium (also referred to as a processor-readable medium) includes any non-transitory medium that participates in providing data (e.g., instructions) that may be read by a computer (e.g., by a processor of a computer). Such a non-transitory medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of non-transitory computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other non-transitory medium from which a computer can read.

Figure 14:
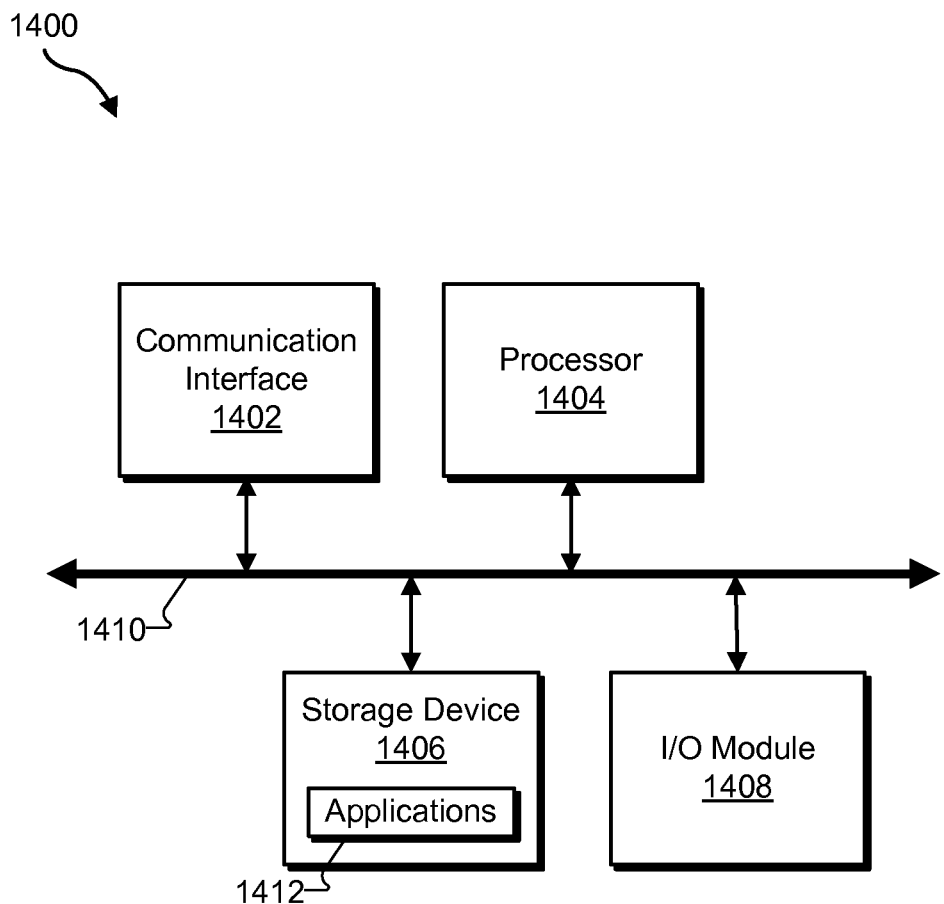
FIG. 14 illustrates an exemplary computing device according to principles described herein.

FIG. 14 illustrates an exemplary computing device 1400 that may be configured to perform one or more of the processes described herein. As shown in FIG. 14, computing device 1400 may include a communication interface 1402, a processor 1404, a storage device 1406, and an input/output ("I/O") module 1408 communicatively connected via a communication infrastructure 1410. While an exemplary computing device 1400 is shown in FIG. 14, the components illustrated in FIG. 14 are not intended to be limiting. Additional or alternative components may be used in other embodiments. Components of computing device 1400 shown in FIG. 14 will now be described in additional detail.

Communication interface 1402 may be configured to communicate with one or more computing devices. Examples of communication interface 1402 include, without limitation, a wireless network interface (such as a wireless network interface card), a modem, and any other suitable interface. Communication interface 1402 may be configured to interface with any suitable communication media, protocols, and formats.

Processor 1404 generally represents any type or form of processing unit capable of processing data or interpreting, executing, and/or directing execution of one or more of the instructions, processes, and/or operations described herein. Processor 1404 may direct execution of operations in accordance with one or more applications 1412 or other computer-executable instructions such as may be stored in storage device 1406 or another non-transitory computer-readable medium.

Storage device 1406 may include one or more data storage media, devices, or configurations and may employ any type, form, and combination of data storage media and/or device. For example, storage device 1406 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1406. For example, data representative of one or more executable applications 1412 (which may include, but are not limited to, one or more of the software applications described herein) configured to direct processor 1404 to perform any of the operations described herein may be stored within storage device 1406. In some examples, data may be arranged in one or more databases residing within storage device 1406.

I/O module 1408 may be configured to receive user input and provide user output and may include any hardware, firmware, software, or combination thereof supportive of input and output capabilities. For example, I/O module 1408 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1408 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1408 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1400. For example, one or more applications 1412 residing within storage device 1406 may be configured to direct processor 1404 to perform one or more processes or functions associated with one or more of the facilities described herein. Likewise, one or more of the storage facilities described herein may be implemented by or within storage device 1406.

The exemplary personal mobile surveillance systems and methods described herein may be designed to promote the safety of one or more people, such as children, women, elderly persons, etc. To this end, surveillance data acquired as described herein may be used to investigate, respond to, and/or handle unsafe events that may affect one or more users of a personal surveillance service provided by the exemplary personal mobile surveillance systems and methods.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    acquiring, by a mobile user device subsystem during operation in accordance with a normal surveillance mode, a first set of surveillance data;
    transmitting, by the mobile user device subsystem during operation in accordance with the normal surveillance mode, the first set of surveillance data to a server subsystem;
    detecting, by the mobile user device subsystem during operation in accordance with the normal surveillance mode, a trigger event that includes a change in usage of resources of the mobile user device subsystem;
    determining, by the mobile user device subsystem in response to the detecting of the trigger event and based on the change in the usage of the resources of the mobile user device subsystem, that there are not sufficient available resources of the mobile user device subsystem for operation in accordance with an enhanced surveillance mode;
    stopping, by the mobile user device subsystem in response to the determining that there are not sufficient available resources, one or more processes operating by way of the mobile user device subsystem to ensure that there are sufficient resources to operate in the enhanced surveillance mode;
    transitioning, by the mobile user device subsystem after stopping the one or more processes, from operation in accordance with the normal surveillance mode to operation in accordance with the enhanced surveillance mode;
    acquiring, by the mobile user device subsystem during operation in accordance with the enhanced surveillance mode, a second set of surveillance data; and
    transmitting, by the mobile user device subsystem during operation in accordance with the enhanced surveillance mode, the second set of surveillance data to the server subsystem;
    wherein the second set of surveillance data comprises an enhanced set of data compared to the first set of surveillance data.

2. The method of claim 1, wherein:
    the mobile user device subsystem transmits data to the server subsystem by way of a wireless network; and
    the transmitting of the second set of surveillance data to the server subsystem consumes more bandwidth of the wireless network than is consumed by the transmitting of the first set of surveillance data to the server subsystem.

3. The method of claim 1, wherein:
    the acquiring of the first set of surveillance data during operation in accordance with the normal surveillance mode comprises periodically acquiring a value for a surveillance data parameter; and the acquiring of the second set of surveillance data during operation in accordance with the enhanced surveillance mode comprises continuously acquiring a value for the same surveillance data parameter.

4. The method of claim 1, wherein:
the acquiring of the first set of surveillance data during operation in accordance with the normal surveillance mode comprises periodically capturing still-shot camera images of an environment of the mobile user device subsystem; and
the acquiring of the second set of surveillance data during operation in accordance with the enhanced surveillance mode comprises capturing video images of the environment of the mobile user device subsystem.

5. The method of claim 1, wherein:
the first set of surveillance data does not include user environment data representative of a condition of an environment of the mobile user device subsystem; and
the second set of surveillance data includes user environment data representative of the condition of the environment of the mobile user device subsystem.

6. The method of claim 1, wherein the second set of surveillance data includes user device status data, user condition data representative of a physical condition of a user associated with the mobile user device subsystem, and user environment data representative of a condition of an environment of the mobile user device subsystem.

7. The method of claim 1, wherein the mobile user device subsystem comprises a mobile phone device.

8. The method of claim 1, wherein the mobile user device subsystem comprises a discrete user-wearable device.

9. The method of claim 1, wherein the mobile user device subsystem comprises a combination of a mobile phone device that communicates with the server subsystem by way of a wireless network and one or more discrete user-wearable devices that capture user environment data representative of a condition of an environment of the mobile user device subsystem and to provide the captured user environment data to the mobile phone device.

10. The method of claim 9, wherein:
the one or more discrete user-wearable devices comprise one or more camera devices; and
the user environment data comprises one or more images of at least a portion of the environment.

11. The method of claim 1, wherein the trigger event is indicative of potential danger to a user of the mobile user device subsystem.

12. The method of claim 1, further comprising providing, by the mobile user device subsystem in response to the detecting of the trigger event, a user interface including an option that initiates a sending of an emergency communication when the option is selected by a user of the mobile user device subsystem.

13. The method of claim 1, further comprising:
receiving, by the server subsystem, the first set of surveillance data and the second set of surveillance data from the mobile user device subsystem by way of a wireless network;
receiving, by the server subsystem, additional surveillance data from one or more additional mobile user device subsystems by way of the wireless network;
detecting, by the server subsystem based on the received surveillance data, a mass emergency event; and
sending, by the server subsystem in response to the detecting of the mass emergency event, an alert message.

14. The method of claim 1, further comprising:
detecting, by the mobile user device subsystem during operation in accordance with the enhanced surveillance mode, an additional trigger event;
transitioning, by the mobile user device subsystem in response to the detecting of the additional trigger event, from operation in accordance with the enhanced surveillance mode back to operation in accordance with the normal surveillance mode;
acquiring, by the mobile user device subsystem during resumed operation in accordance with the normal surveillance mode, the first set of surveillance data; and
transmitting, by the mobile user device subsystem during resumed operation in accordance with the normal surveillance mode, the first set of surveillance data to the server subsystem.

15. The method of claim 1, embodied as computer-executable instructions on at least one non-transitory computer-readable medium.

16. The method of claim 1, wherein:
the mobile user device subsystem comprises a combination of
a mobile phone device that communicates with the server subsystem by way of a wireless network, and
one or more discrete user-wearable devices that capture user environment data representative of a condition of an environment of the mobile user device subsystem and that provide the captured user environment data to the mobile phone device; and
the mobile phone device and the one or more discrete user-wearable devices are each associated with one user of the mobile user device subsystem.

17. A method comprising:
receiving, by a server subsystem from a mobile user device subsystem operating in accordance with a normal surveillance mode, a first set of surveillance data;
storing, by the server subsystem, the first set of surveillance data;
detecting, by the server subsystem based on the first set of surveillance data, a predefined trigger event that includes a change in usage of resources of the mobile user device subsystem;
determining, by the server subsystem in response to the detecting of the trigger event and based on the change in the usage of the resources of the mobile user device subsystem, that there are not sufficient available resources of the mobile user device subsystem for operation in accordance with an enhanced surveillance mode;
instructing, by the server subsystem in response to the determining that there are not sufficient available resources, the mobile user device subsystem to stop one or more processes operating by way of the mobile user device subsystem to ensure that there are sufficient resources to operate in the enhanced surveillance mode;
instructing, by the server subsystem after the mobile user device subsystem stops the one or more processes, the mobile user device subsystem to transition from operating in accordance with the normal surveillance mode to operating in accordance with the enhanced surveillance mode;
receiving, by the server subsystem from the mobile user device subsystem operating in accordance with the enhanced surveillance mode, a second set of surveillance data; and
storing, by the server subsystem, the second set of surveillance data;

wherein the second set of surveillance data comprises an enhanced set of data compared to the first set of surveillance data.

18. The method of claim 17, wherein the trigger event is indicative of potential danger to a user of the mobile user device subsystem.

19. The method of claim 17, further comprising:
receiving, by the server subsystem, additional surveillance data from one or more additional mobile user device subsystems; and
detecting, by the server subsystem based on the received surveillance data, a mass emergency event; and
sending, by the server subsystem in response to the detecting of the mass emergency event, an alert message.

20. The method of claim 17, further comprising:
detecting, by the server subsystem based on the second set of surveillance data, an additional predefined trigger event; and
instructing, by the server subsystem in response to the detecting of the additional predefined trigger event, the mobile user device subsystem to transition back from operating in accordance with the enhanced surveillance mode to operating in accordance with the normal surveillance mode.

21. The method of claim 17, embodied as computer-executable instructions on at least one non-transitory computer-readable medium.

22. A system comprising:
a server subsystem comprising at least one server device; and
a mobile user device subsystem that comprises at least one user device, that is communicatively coupled to the server subsystem by way of a wireless network, and that acquires and transmits a first set of surveillance data to the server subsystem,
detects a trigger event indicative of potential danger to a user associated with the mobile user device subsystem,
determines, in response to the detection of the trigger event and based on a change in usage of resources of the mobile user device subsystem, that there are not sufficient available resources of the mobile user device subsystem to acquire a second set of surveillance data,
stops, in response to the determining that there are not sufficient available resources, one or more processes operating by way of the mobile user device subsystem to ensure that there are sufficient resources to acquire the second set of surveillance data, and
acquires and transmits, after the stopping of the one or more processes, the second set of surveillance data to the server subsystem,
wherein the second set of surveillance data comprises an enhanced set of data compared to the first set of surveillance data.

23. The system of claim 22, wherein the server subsystem
receives the first set of surveillance data and the second set of surveillance data from the mobile user device subsystem by way of the wireless network,
receives additional surveillance data from one or more additional mobile user device subsystems by way of the wireless network,
detects, based on the received surveillance data, a mass emergency event, and
sends, in response to the detection of the mass emergency event, an alert message.

* * * * *